United States Patent
Nguyen et al.

(10) Patent No.: US 10,647,907 B2
(45) Date of Patent: May 12, 2020

(54) COMPOSITIONS FOR ENHANCED OIL RECOVERY

(71) Applicant: Ecolab USA Inc., St. Paul, MN (US)

(72) Inventors: Duy T. Nguyen, Sugar Land, TX (US); Tzu-Ping Hsu, Richmond, TX (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 16/026,345

(22) Filed: Jul. 3, 2018

(65) Prior Publication Data

US 2019/0010381 A1  Jan. 10, 2019

Related U.S. Application Data

(60) Provisional application No. 62/690,442, filed on Jun. 27, 2018, provisional application No. 62/529,206, filed on Jul. 6, 2017.

(51) Int. Cl.

| | | |
|---|---|---|
| *E21B 43/16* | (2006.01) | |
| *E21B 43/22* | (2006.01) | |
| *E21B 43/267* | (2006.01) | |
| *C09K 8/584* | (2006.01) | |
| *C09K 8/80* | (2006.01) | |
| *E21B 43/26* | (2006.01) | |

(52) U.S. Cl.
CPC ............ *C09K 8/584* (2013.01); *C09K 8/80* (2013.01); *E21B 43/16* (2013.01); *E21B 43/261* (2013.01); *E21B 43/267* (2013.01)

(58) Field of Classification Search
CPC .......... C09K 8/584; C09K 8/80; E21B 43/16; E21B 43/261
See application file for complete search history.

(56) References Cited

U.S. PATENT DOCUMENTS

| | | | | |
|---|---|---|---|---|
| 5,306,489 A | * | 4/1994 | Goldberg | A61K 8/42 424/47 |
| 5,837,664 A | * | 11/1998 | Black | C11D 3/201 510/230 |
| 7,629,299 B2 | | 12/2009 | Berger et al. | |
| 2007/0079963 A1 | | 4/2007 | Yang et al. | |
| 2008/0217009 A1 | | 9/2008 | Yang | |
| 2010/0160187 A1 | | 6/2010 | Nguyen et al. | |
| 2011/0021386 A1 | | 1/2011 | Ali et al. | |
| 2012/0283333 A1 | * | 11/2012 | Xia | A01N 33/12 514/635 |
| 2013/0081822 A1 | | 4/2013 | Han et al. | |
| 2015/0068744 A1 | | 3/2015 | Welton et al. | |
| 2015/0267104 A1 | | 9/2015 | Puerto et al. | |
| 2015/0275627 A1 | * | 10/2015 | Xu | G01N 13/02 166/369 |
| 2015/0275634 A1 | | 10/2015 | Nguyen et al. | |
| 2015/0290834 A1 | * | 10/2015 | Klotz | B28B 1/007 210/510.1 |
| 2016/0083639 A1 | | 3/2016 | Xu et al. | |
| 2016/0177171 A1 | | 6/2016 | Hernández Al Tamirano et al. | |
| 2016/0251568 A1 | | 9/2016 | Do et al. | |
| 2016/0280986 A1 | | 9/2016 | Xu et al. | |

FOREIGN PATENT DOCUMENTS

| | | |
|---|---|---|
| CN | 102587126 B | 4/2014 |
| EP | 0819422 A1 | 2/1998 |
| GB | 2474017 A | 4/2011 |
| WO | 2013/148760 A1 | 10/2013 |
| WO | 2013/174823 A1 | 11/2013 |
| WO | 2014/176421 A1 | 10/2014 |
| WO | 2016/138072 A1 | 9/2016 |

OTHER PUBLICATIONS

Written Opinion for International Application No. PCT/US2018/040712, dated Oct. 1, 2018, 9 pages.
International Search Report for International Application No. PCT/US2018/040712, dated Oct. 1, 2018, 6 pages.
Johannes Karl Fink, "Clay Stabilization," Chapter 3, Petroleum Engineer's Guide to Oil Field Chemical and Fluids, 2012, pp. 125-148.

* cited by examiner

*Primary Examiner* — Zakiya W Bates
(74) *Attorney, Agent, or Firm* — Kagan Binder, PLLC

(57) ABSTRACT

Compositions and methods for increasing recovery, or flowback, of hydrocarbon compounds from hydrocarbon-containing subterranean reservoirs. The compositions include a dialkyl dimethyl ammonium surfactant, an amphoteric surfactant, and a solvent. The concentrated compositions are storage stable and easily diluted with a water source such as produced water to form injectates suitable for injecting into one or more hydrocarbon-bearing subterranean reservoirs. The injectates convert oil-wet rocks to water-wet but do not cause formation of emulsions with hydrocarbon compounds within the subterranean environment. Injection of the injectates into a reservoir results in an increase in the yield of hydrocarbons recovered, in particular from low permeability, low porosity reservoirs such as those formed by or encountered in hydraulic fracturing and/or in certain geographic locations.

19 Claims, No Drawings

COMPOSITIONS FOR ENHANCED OIL RECOVERY

FIELD OF THE INVENTION

The present invention relates to compositions and methods for increased recovery of hydrocarbon from a subterranean hydrocarbon-bearing formation.

BACKGROUND

Chemical additives are used throughout the petroleum industry for increasing the rate or total amount of hydrocarbon compounds recovered from subterranean hydrocarbon-bearing reservoirs. Conventionally, chemical additives including one or more surfactants (and optionally other materials such as polymers) are combined with a fluid, usually a water source, and this combination is injected underground. Such combinations may be referred to as "injectates." The injected surfactants lower the interfacial tension between the fluid and/or connate (subterranean water source) and the hydrocarbon (oil); and may further change the wettability of the reservoir rock, thereby increasing the yield of hydrocarbon compounds released and/or the rate of their recovery.

Injectates are suitably optimized for use in one or more specific industrial processes directed to maximizing yield of hydrocarbon recovery from a subterranean reservoir, maximizing the rate of recovery of hydrocarbon from a subterranean reservoir, or both. Such use may be before or after establishment of a well, wherein "well" is understood to indicate a fluid connection between a hydrocarbon within a subterranean reservoir, and a point proximal to the surface of the earth suitably situated to allow collection of the hydrocarbon from the reservoir. In man-made wells, this point may be referred to as a wellbore, which is a man-made fluid connection to a subterranean hydrocarbon-bearing reservoir. The wellbore may be adapted to collect hydrocarbon, to inject one more injectates, or both by including one or more pipes, tanks, pumps and the like. The use of injectates is not generally limited by the type of reservoir or the type of hydrocarbon, and injectates are injected into nearly every such formation in order to maximize yield of hydrocarbon obtained from the reservoir.

For example, injectates may be injected contemporaneously with establishment of a well, such as by hydraulic fracturing. An injectate may suitably be combined with a proppant, wherein the combination is a fracturing fluid. The fracturing fluid is used in a hydraulic fracturing process to establish a well. Surfactants present in the fracturing fluid may achieve well stimulation during fracturing, wherein applied hydraulic pressure can further assist in distributing the surfactants within the reservoir. Hydraulic fracturing techniques are useful to form new wells as well as to extend the life of existing wells. Injectates including surfactants are known to be useful in both of these applications.

Injectates are also used in enhanced recovery of hydrocarbons from wells. "Enhanced hydrocarbon recovery" refers to processes carried out after a well is established for the purpose of increasing the rate or total amount of hydrocarbon collected. Enhanced hydrocarbon recovery is typically initiated once a reduction in the rate of collection of hydrocarbon from the well is observed, in order to "reinvigorate" the well (often referred to in the art as secondary oil recovery) and/or when collection has substantially stopped (often referred to in the art as tertiary oil recovery). Injectates for enhanced hydrocarbon recovery conventionally include surfactants and/or polymers.

However, surfactants employed in injectates and fracturing fluids may adsorb substantially onto the rock surfaces after injection, depleting the surfactant quickly at the expense of deeper-lying rock surfaces. Additionally, many injected surfactants facilitate underground emulsion formation between the hydrocarbon and connate, which retards or prevents recovery of the hydrocarbon. Even further, surfactants and mixtures thereof are often unstable or insoluble in the high temperature and/or high total dissolved solids water sources encountered in some subterranean reservoirs. For example, in some reservoirs temperatures in excess of 60° C. are encountered; temperatures can be as high as 250° C. Additionally, underground water (connate) is often characterized as having high total dissolved solids, such as about 4 wt % total dissolved solids and as much as about 35 wt % total dissolved solids. In some cases, a substantial portion of the dissolved solids are ionic (one or more salts).

Even further still, surfactants and mixtures thereof are often unstable or insoluble in concentrations above about 1-10 wt % active ingredients (non-solvent chemical additives). In some instances this instability is due to electronic interactions between ionic surfactants employed in the mixtures. Thus, conventional surfactant mixtures, such as concentrates for use in forming injectates, requires the incorporation, transportation, and storage of mixtures having as much as 90 wt % inactive ingredients. Such use of inactive ingredients is inefficient and wasteful.

In addition to the foregoing problems known to exist in the injectate art, there is a paucity of injectate compositions that are effective to increase either the rate or amount of hydrocarbon recoverable from wells characterized as having "tight" or "very tight" subterranean reservoir rock. Such tight rock is characterized as having permeability of about 0.1 milliDarcy (mD) or less, with "very tight" rock characterized as having permeability of about 0.01 mD or less. Some hydrocarbon-bearing shale formations have permeability as low as 0.0001 mD for example. Efficient recovery of hydrocarbons trapped within a tight rock matrix is a known problem in the industry. As petroleum supplies from conventional oilfield rock become depleted, technologies addressing the problem of tight rock will increase in importance and value.

There is also a paucity of solutions for improving rate or amount of hydrocarbon recovered from reservoirs where the crude hydrocarbon is characterized as "heavy oil", that is, hydrocarbon having American Petroleum Institute gravity or "API gravity" of about 28 or less as "crude" hydrocarbon recovered from the well. API gravity is a measure of how dense a petroleum liquid is compared to water, wherein the density of water is 10. API gravity of greater than 10 correlates to a petroleum liquid that has lower density than water, whereas API gravity of less than 10 correlates to a petroleum liquid that has higher density than water. Generally, though not always, heavier oils have lower paraffin content and higher content of asphaltenes, resins (polymerized materials), and aromatic compounds than lighter oils. Efficient recovery of heavy oil is a known problem in the industry.

There is a need in the industry for compositions that reduce the interfacial tension between a fluid and hydrocarbon trapped within subterranean rock formations without adsorbing strongly to the rock surfaces. There is a need in the industry for compositions that are stable in high temperature environments, high total dissolved solids environments, or high temperature/high total dissolved solids environments. There is a need in the industry for compositions that increase the yield of hydrocarbon compounds recovered from subterranean reservoirs without forming subterranean water-oil emulsions. There is a need in the industry for concentrated compositions (concentrated injectates) to improve efficiency of manufacturing and transportation thereof. There is a need in the industry for concentrated compositions that are easily and quickly diluted prior to or during injection thereof into subterranean environments that include high total dissolved solids, high temperature, or a combination thereof. There is a need in the industry for compositions that increase the yield of hydrocarbon compounds recovered during hydraulic fracturing operations. There is a need in the industry for compositions that increase the yield of hydrocarbon compounds recovered during enhanced hydrocarbon recovery operations. There is a need in the industry for compositions that increase the yield of hydrocarbon compounds recovered from tight rock or very tight rock formations. There is a need in the industry for compositions that increase the yield of hydrocarbon recovered from reservoirs wherein the crude hydrocarbon has an API gravity of about 28 or less.

SUMMARY

Disclosed herein are compositions and methods for recovery of hydrocarbons from subterranean hydrocarbon-bearing reservoirs. The compositions are injectates for injection into one or more subterranean reservoirs. The compositions may further include a proppant (fracturing fluid) for injection contemporaneously with hydraulic fracturing. Also disclosed herein are concentrated compositions (concentrates) useful for forming the injectates or fracturing fluids, that are stable at concentrations over 10 wt %. Also disclosed are methods of increasing hydrocarbon yield or rate of flow of a hydrocarbon from a subterranean reservoir, wherein the method includes injecting an injectate or a fracturing fluid into the reservoir. In embodiments, the subterranean reservoir is a tight shale reservoir, a sandstone reservoir, or a carbonate reservoir. In embodiments, the subterranean reservoir includes low permeability—stated differently, the reservoir is characterized as having tight rock, or in some embodiments very tight rock. In embodiments, the hydrocarbon has up to about 40 wt % paraffin content. In embodiments, the hydrocarbon has an API gravity of 28 or less.

Disclosed herein are compositions comprising, consisting essentially of, or consisting of a dialkyl dimethyl ammonium surfactant or a mixture of two or more thereof; an amphoteric surfactant or a mixture of two or more thereof; and a solvent or mixture of two or more thereof. In embodiments the solvent is selected from a water source, a coupling agent, or a mixture of two or more of these. In embodiments, the water source is tap water. In embodiments, the water source is produced water. Produced water includes one or more of injectate, connate (native water source present in the subterranean formation along with the hydrocarbon), sea water, and hydrocarbon liquids or solids entrained (dispersed, emulsified, or dissolved) therein. In embodiments, coupling agents are selected from C1-C6 alcohols, C1-C6 diols, alkyl ethers of C1-C6 diols (e.g., ethylene glycol mono-n-butyl ether) polyalkylene glycols, and mixtures thereof. In some embodiments, the coupling agent comprises, consists essentially of, or consists of methanol, ethanol, glycerol, ethylene glycol, or a combination thereof. In embodiments, the compositions exclude anionic surfactants. In embodiments, the compositions exclude nonionic surfactants. In embodiments, the compositions exclude both anionic surfactants and nonionic surfactants. In embodiments, the ratio of the dialkyl dimethyl ammonium surfactant to the amphoteric surfactant in the composition is about 10:1 to 1:10 by weight.

In some embodiments, the composition is a concentrate, the concentrate including about 5 wt % to 90 wt % total surfactant based on the weight of the concentrate. In embodiments, the concentrates are characterized as flowable, pumpable, or pourable at temperatures between about −40° C. and 100° C. In embodiments, the concentrates are stored in a container. In embodiments the concentrates are storage stable for at least 24 hours and as much as two years at temperatures between about −40° C. and 100° C. In embodiments the concentrates are transported, before or after storage, to a location proximal to a reservoir or a wellbore. In some embodiments, the compositions further include one or more additives, wherein the additives are selected from demulsifiers, clay stabilizers, corrosion inhibitors, scale inhibitors, viscosifying agents, flow back aids, friction reducers, proppants, biocides, or a mixture of two or more thereof.

In embodiments, a concentrate is diluted with a water source to form an injectate. In embodiments the water source is a produced water. In embodiments the water source is a high temperature water source, a high total dissolved solids water source, or a high temperature, high total dissolved solids water source. In some embodiments, the high temperature water source comprises a temperature of about 60° C. to 250° C., or about 60° C. to 120° C. In some embodiments, the high total dissolved solids water source comprises about 4 wt % to 30 wt % total dissolved solids. In embodiments, an injectate is formed by combining about 95 wt % to 99.999 wt % of a water source and about 0.001 wt % to 5 wt % total of a combination of a dialkyl dimethyl ammonium surfactant or a mixture of two or more thereof; and an amphoteric surfactant or a mixture of two or more thereof. In embodiments, an injectate is formed by combining about 99 wt % to 99.999 wt % of a water source with a concentrate. In embodiments, the injectates comprise or consist essentially of 99 wt % to 99.999 wt % of a water source and about 10 ppm to 10,000 ppm total of a combination of a dialkyl dimethyl ammonium surfactant or a mixture of two or more thereof; and an amphoteric surfactant or a mixture of two or more thereof.

In embodiments, the injectate is injected into a subterranean reservoir during hydraulic fracturing. In such embodiments, a proppant is combined with an injectate to form a fracturing fluid prior to the injecting during hydraulic fracturing. In embodiments, the injectate is injected after hydraulic fracturing. In embodiments, the injectate is injected into a conventional subterranean well (formed by a process that does not include hydraulic fracturing). In embodiments, conditions within a subterranean reservoir include high temperature, high total dissolved solids water sources, or both in at least one subterranean area contacted by the injectate. In some embodiments, the subterranean reservoir includes hydrocarbon-bearing rock having permeability of less than 0.1 mD, or less than 0.01 mD. After injecting the injectate, a hydrocarbon is recovered or collected. In embodiments, the collected (crude) hydrocarbon has up to about 40 wt % paraffin content. In embodiments, the collected hydrocarbon has an API gravity of 28 or less.

In embodiments, the injecting is injecting into a first well, called an injection well; and the hydrocarbon is recovered from the first well after the injecting. In embodiments, the injecting is into a first well, and the hydrocarbon is collected or recovered from a second well.

The injectates and fracturing fluids, upon subterranean injection, are thermally stable when subjected to underground conditions including temperatures of about 60° C. to 120° C. Upon injection, rock surfaces contacted by the injectates or fracturing fluids changes from oil-wettable to water-wettable. Yet the injectates and fracturing fluids exhibit a low tendency to adsorb onto subterranean rock. The injectates and fracturing fluids further substantially lower the interfacial energy between the connate and the hydrocarbons present in subterranean reservoirs. Yet the injectates and fracturing fluids also inhibit formation of emulsions in underground fluid flows. Injection of the injectates and fracturing fluids causes an increase in the rate of hydrocarbon collection, or an increase total yield of recovered hydrocarbon, or both. The fracturing fluids further exhibit improved proppant clean-up performance under gravitational flow conditions when compared to conventional fracturing fluids.

DETAILED DESCRIPTION

Definitions

Unless otherwise defined, all technical and scientific terms used herein have the same meaning as commonly understood by one of ordinary skill in the art. In case of conflict, the present document, including definitions, will control.

As used herein, the term "surfactant" means a compound having at least one hydrophilic portion and at least one hydrophobic portion, wherein the compound is capable of spontaneous self-aggregation in aqueous compositions.

As used herein, the term "cationic surfactant" means a surfactant having no anionic moieties covalently bonded to the molecule and one or more cationic moieties covalently bonded to the molecule.

As used herein, the term "anionic surfactant" means a surfactant having no cationic moieties covalently bonded to the molecule and one or more anionic moieties covalently bonded to the molecule.

As used herein, the term "nonionic surfactant" means a surfactant having no ionic moieties covalently bonded to the molecule.

As used herein, the term "amphoteric surfactant" means a surfactant having one or more anionic moieties covalently bonded to the molecule and one or more cationic moieties covalently bonded to the molecule, and a net molecular charge of zero. Stated differently, an amphoteric surfactant is an electrically neutral compound having formal unit electrical charges of opposite sign.

As used herein, the term "water source" means water substantially in a liquid state and comprising, consisting essentially of, or consisting of fresh water, tap water, well water, deionized water, distilled water, produced water, municipal water, waste water such as runoff water, "gray" water, or municipal waste water, treated or partially treated waste water, brackish water, or sea water, or a combination of two or more such water sources as determined by context; and present. In embodiments, a water source includes one or more salts, ions, buffers, acids, bases, surfactants, or other dissolved, dispersed, or emulsified compounds, materials, components, or combinations thereof. The term "produced water" refers to a water source that is present within and/or flows from a subterranean reservoir; produced water includes connate unless otherwise specified. Generally, the term "water source" includes all of the following unless otherwise specified or determined by context: water, connate, produced water, water having high total dissolved solids, water having high temperature, and water having both high total dissolved solids and high temperature. The terms "waterbased", "water solution", "aqueous" and the like generally refer to a composition including a water source.

As used herein, the terms "pumpable", "pourable", "flow" "pour point", or like terms referring to a composition of the invention means that 10 mL of the composition vertically at rest on a substantially horizontal surface in a cylindrical container having dimensions of radius 1 inch and height 2 inches flows observably within about 10 seconds when tipped to a substantially horizontal position. In some embodiments, "pumpable", "pourable", "flow", or like terms referring to a composition of the invention means a composition having a Brookfield viscosity at 10 s$^{-1}$ of about 5 cP to 1000 cP at a temperature selected for pumping, pouring, or flowing.

As used herein, the term "stable" as applied to a composition means a kinetically stable composition that absent any force applied, temperature change, or chemical added, is or is capable of being substantially free of coagulation, plating out, precipitation, gross coalescence of phases (conventionally referred to as "separation") or any other evidence of instability for at least about 24 hours at about 20° C. As used herein, the term "storage stable" as applied to a concentrate means that the concentrate is stable after at least six months of storage at temperatures between about −25° C. and 60° C. As used, herein, the term "stable" as applied to an injectate means that the injectate does not undergo phase separation within a subterranean reservoir for a period of at least 7 days to 90 days; or that the injectate does not undergo phase separation when stored at 160° C. for at least 30 days; or both.

As used herein, the term "injectate" means a composition for injecting into a subterranean reservoir, or a composition that is injected into a subterranean reservoir, or a composition previously injected into a subterranean reservoir and present therein. The injectate may further include a proppant, wherein the combination of injectate and proppant is referred to herein as a "fracturing fluid". Discussions related to injectates and injection of injectates generally also relates to fracturing fluids and injection of fracturing fluids, as specified or determined by context. It will be understood that the proppant present in a fracturing fluid does not materially affect the chemical properties of the injectate but instead is chemically inert or substantially chemically inert within the fracturing fluid. As such, discussions relating to improved rate or yield of hydrocarbon from a subterranean reservoir due to injection of an injectate, including modification of properties such as interfacial energy or rock surface wettability also apply generally to fracturing fluids, unless otherwise specified or determined by context.

As used herein, the term "well" refers to a fluid connection between a hydrocarbon within a subterranean reservoir, and a point proximal to the surface of the earth suitably situated to collect at least a portion of the hydrocarbon. Optionally, the point of collection is further adapted to collect the hydrocarbon, or to inject an injectate into the reservoir, or both. Similarly, the term "wellbore" refers to a man-made fluid connection to a hydrocarbon within a subterranean reservoir. A wellbore is adapted to collect the hydrocarbon, or to inject an injectate into the reservoir, or both, for example by including one or more pipes, tanks, pumps and the like. A well may include one wellbore, or two or more wellbores.

As used herein, the terms "hydrocarbon" and "oil" generally refer to crude petroleum products, unless otherwise specified or determined by context. Crude petroleum products are hydrocarbon compounds as recovered or collected from a subterranean reservoir, and prior to any further processing or refining thereof.

As used herein, the term "high temperature" refers to a water source, a subterranean reservoir, or a combination thereof having a temperature of about 60° C. to 120° C., as specified or determined by context.

As used herein, the term "high total dissolved solids" refers to a water source including at least about 0.5 wt % solids dissolved therein, and in embodiments up to about 30 wt % solids dissolved therein. In general, "saline" or "salinity" refers to a water source wherein a portion, in some embodiments a substantial portion, the total dissolved solids are salts, as determined by context.

As used herein, the term "high pressure" means pressure in excess of atmospheric pressure on the surface of the earth, further as encountered within one or more subterranean reservoirs as a result of natural forces present within reservoir, as a result of human activity such as hydraulic fracturing, or a combination thereof.

As used herein, the term "tight rock" means solid subterranean rock having permeability of 0.1 milliDarcy (mD) or less and hydrocarbon entrained within the rock matrix. "Very tight rock" indicates permeability of 0.01 mD or less.

As used herein, the term "heavy oil" means crude hydrocarbon having American Petroleum Institute gravity, or "API gravity" of about 28 or less.

As used herein, the term "enhanced hydrocarbon recovery" or "enhanced oil recovery" refers to injection of compositions into a subterranean reservoir to increase the rate or total amount of hydrocarbon collected from a previously established well. Enhanced hydrocarbon recovery includes "secondary hydrocarbon (oil) recovery" which includes injection initiated when a reduction in the rate of flow of hydrocarbon from a well is observed. Enhanced hydrocarbon recovery also includes "tertiary hydrocarbon (oil) recovery", which includes injection initiated when rate of flow of hydrocarbon from a well has stopped or substantially stopped.

As used herein, the term "optional" or "optionally" means that the subsequently described component, event or circumstance may but need not be present or occur. The description therefore discloses and includes instances in which the event or circumstance occurs and instances in which it does not, or instances in which the described component is present and instances in which it is not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe a range of values, for example "about 1 to 5" the recitation means "1 to 5" and "about 1 to about 5" and "1 to about 5" and "about 1 to 5" unless specifically limited by context.

As used herein, the term "substantially" means "consisting essentially of", as that term is construed in U.S. patent law, and includes "consisting of" as that term is construed in U.S. patent law. For example, a solution that is "substantially free" of a specified compound or material may be free of that compound or material, or may have a minor amount of that compound or material present, such as through unintended contamination or incomplete purification. A "minor amount" may be a trace, an unmeasurable amount, an amount that does not interfere with a value or property, or some other amount as provided in context. A composition that has "substantially only" a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

Discussion

The following descriptions of the compositions include descriptions of individual components thereof, wherein any of the individual components are intended to be combined with any other individual components without limitation except where specified otherwise. In particular, discussions of concentrates, injectates, and fracturing fluids are intended to relate to each and every embodiment of these compositions disclosed below. Further, discussions of methods of use and related processes apply to methods of use and related processes for each and every concentrate, injectate, and fracturing fluid disclosed.

Disclosed herein are compositions for increasing rate and/or yield of collection of a hydrocarbon from a subterranean formation. The compositions are suitably concentrates, injectates, or fracturing fluids.

The compositions comprise, consist essentially of, or consist of a dialkyl dimethyl ammonium surfactant or a mixture of two or more thereof, an amphoteric surfactant or a mixture of two or more thereof; and a solvent. The solvent is water, a water source, a coupling agent or a combination of two or more of these. In embodiments, the compositions exclude anionic surfactants. In embodiments, the compositions exclude nonionic surfactants. In embodiments, the compositions exclude both anionic and nonionic surfactants. In embodiments the compositions exclude polymeric surfactants. In embodiments the compositions further include one or more polymeric demulsifiers. In embodiments, the compositions exclude compounds that include silicon, fluorine, or both silicon and fluorine.

In embodiments, the composition is a concentrate, while in other embodiments the composition is an injectate. In embodiments, the concentrates include about 5 wt % to 90 wt % total surfactant content based on the weight of the concentrate and are characterized as stable and flowable, pumpable, or pourable at temperatures between about −40° C. and 100° C. The concentrates are storage stable for about 24 hours to two years at temperatures between about −40° C. and 100° C. Injectates include about 10 ppm to 10,000 ppm total surfactant content based on the weight of the injectate. In embodiments, a concentrate is combined with a water source to form an injectate. In some embodiments the water source is a high temperature water source, a high total dissolved solids water source, or a high temperature/high total dissolved solids water source. In embodiments, the injectates are stable within subterranean reservoirs for a period of at least 7 days to 90 days. In embodiments, the subterranean reservoir includes subterranean conditions including one or more of: rock or mineral surfaces; connate or produced water including high total dissolved solids; high temperature; and high pressure.

In embodiments, the dialkyl dimethyl ammonium surfactant has the structure $R^1R^2N^+(CH_3)_2 X^-$, wherein $R^1$ and $R^2$ are independently selected from linear, branched, alicyclic, aryl, and alkaryl groups; and $X^-$ is an anion. In embodiments, $R^1$ and $R^2$ are independently selected from saturated linear or branched alkyl groups having 8 to 30 carbon atoms, or 10 to 28 carbon atoms, or 10 to 18 carbon atoms, or 12 to 24 carbon atoms, or 12 to 22 carbon atoms, or 12 to 20 carbon atoms, or 12 to 18 carbon atoms. In embodiments $X^-$ is a halide, such as chloride or bromide, but $X^-$ is not particularly limited.

In embodiments, the dialkyl dimethyl ammonium surfactant is a blend of two or more dialkyl dimethyl ammonium surfactants. Examples of useful dialkyl dimethyl ammonium surfactants include dicocodimethyl ammonium chloride (CAS No. 61789-77-3) and di-hydrogenated tallow dimethyl ammonium chloride. The coco moiety has a conventional weight distribution of saturated alkyl groups corresponding to about 10% C18; 10-20% C16; 20-30% C14; 40-50% C12; and 10% C10. Tallow is a fatty substance consisting of a mixture of glycerides, including glycerides of stearic, palmitic, and oleic glycerides; the mixture is extracted chiefly from the suet of sheep and cattle. Hydrogenation of tallow glycerides converts oleyl moieties to stearyl moieties. The di-hydrogenated tallow dimethyl ammonium chloride is then formed by reacting two moles of hydrogenated tallow glyceride with methyl amine, followed by reaction with methyl chloride to form the ammonium chloride.

The amphoteric surfactant, also termed a zwitterionic surfactant, includes at least one internal anionic moiety, at least one internal cationic moiety, and has a net internal charge of zero. In embodiments, the amphoteric surfactant consists essentially of a single internal cation, a single internal anion, and a hydrophobic moiety selected from linear, branched, alicyclic, aryl, and alkaryl groups having 6 to 50 carbon atoms. In embodiments, the amphoteric surfactant includes at least one internal cationic moiety comprising ammonium or phosphonium; and at least one internal anionic moiety comprising sulfonate, sulfate, oxide, carboxylate, phosphate, phosphite, or phosphonate. In embodiments, the amphoteric surfactant includes at least one internal cationic moiety comprising ammonium or phosphonium; and at least one internal anionic moiety comprising sulfonate. In embodiments, the amphoteric surfactant includes at least one internal hydroxyl group.

Examples of useful amphoteric surfactants include those having a hydrophobic moiety selected from linear, branched, alicyclic, aryl, and alkaryl groups having 6 to 50 carbon atoms, or 8 to 50 carbon atoms, or 10 to 50 carbon atoms, or 12 to 50 carbon atoms, or 6 to 40 carbon atoms, or 6 to 30 carbon atoms, or 8 to 30 carbon atoms, or 10 to 30 carbon atoms, or 12 to 30 carbon atoms. One useful class of amphoteric surfactants is amino acids having a hydrophobic moiety selected from linear, branched, alicyclic, aryl, and alkaryl groups having 6 to 50 carbon atoms, or 8 to 50 carbon atoms, or 10 to 50 carbon atoms, or 12 to 50 carbon atoms, or 6 to 40 carbon atoms, or 6 to 30 carbon atoms, or 8 to 30 carbon atoms, or 10 to 30 carbon atoms, or 12 to 30 carbon atoms, including for example N-dodecyl-N,N-dimethyl glycine. Another class of useful amphoteric surfactants is trialkylamine oxides having a hydrophobic moiety selected from linear, branched, alicyclic, aryl, and alkaryl groups having 6 to 50 carbon atoms, or 8 to 50 carbon atoms, or 10 to 50 carbon atoms, or 12 to 50 carbon atoms, or 6 to 40 carbon atoms, or 6 to 30 carbon atoms, or 8 to 30 carbon atoms, or 10 to 30 carbon atoms, or 12 to 30 carbon atoms. Representative examples of such amphoteric surfactants include N,N-dimethyl-N-dodecyl amine oxide, N,N-dimethyl-N-hexadecyl amine oxide, N,N-dimethyl-N-octadecyl amine oxide, and N,N-dimethyl-N—(Z-9-octadecenyl)-N-amine oxide.

Another class of useful amphoteric surfactants is betaines, which include one internal carboxylate moiety, one internal ammonium moiety, and a hydrophobic moiety selected from linear, branched, alicyclic, aryl, and alkaryl groups having 6 to 50 carbon atoms, or 8 to 50 carbon atoms, or 10 to 50 carbon atoms, or 12 to 50 carbon atoms, or 6 to 40 carbon atoms, or 6 to 30 carbon atoms, or 8 to 30 carbon atoms, or 10 to 30 carbon atoms, or 12 to 30 carbon atoms. Representative but nonlimiting examples of betaines include 2-(dodecyldimethylammonio)acetate (CAS No. 683-10-3), cocamidopropyl betaine (2-[3-(dodecanoylamino)propyl-dimethylazaniumyl]acetate), dodecanamidopropyl betaine ({2-[3-(dodecanoylamino)propyl]triazan-2-ium-2-yl}acetate), cetyl betaine (2-[hexadecyl(dimethyl)azaniumyl]acetate), oleamidopropyl betaine ((Z)-(carboxymethyl)dimethyl-3-((1-oxo-9-octadecenyl)amino) propylammonium hydroxide), and caprylamidopropyl betaine (2-[dimethyl-[3-(octanoylamino)propyl]azaniumyl] acetate). Another class of useful amphoteric surfactants is sultaines, which include one internal sulfonate moiety and one internal ammonium moiety (also referred to as sulfobetaines). Examples of sultaines are lauryl sulfobetaine (3-(dodecyldimethylammonio)propane-1-sulfonate), capryl sulfobetaine (3-[decyl(dimethyl)azaniumyl]propane-1-sulfonate), myristyl sulfobetaine (3-[dimethyl(tetradecyl) azaniumyl]propane-1-sulfonate), Sulfobetaine 10 (CAS No. 15163-36-7), Sulfobetaine 3-14 (N-tetradecyl-N,N-dimethyl-3-ammonio-1-propanesulfonate), Sulfobetaine 3-10 (N-decyl-N,N-dimethyl-3-ammonio-1-propanesulfonate); alkylether hydroxypropyl sultaines and alkyldimethylhydroxysultaines such as lauryl hydroxysultaine (3-[dodecyl (dimethyl)ammonio]-2-hydroxypropane-1-sulfonate; 351.55 g/mol; CAS No. 13197-76-7), myristamidopropyl hydroxysultaine (2-hydroxy-N,N-dimethyl-N-(3-((1-oxotetradecyl)amino)propyl)-3-sulfo-, inner salt); and the like. Mixtures of such surfactants having various carbon chain lengths are obtained in some embodiments; for example, 3-((C10-C16)-alkyldimethylammonio)-2-hydroxypropane-sulfonate (CAS No. 72869-77-3) is a mixture of alkylated moieties having an average of 10 to 16 carbons.

Another class of useful amphoteric surfactants is phosphate functional amphoteric surfactants, which include one internal phosphate moiety, one internal ammonium moiety, optionally a carboxylate moiety, and either one or two hydrophobic moieties, wherein each hydrophobic moiety is selected from linear, branched, alicyclic, aryl, and alkaryl groups having 6 to 50 carbon atoms, or 8 to 50 carbon atoms, or 10 to 50 carbon atoms, or 12 to 50 carbon atoms, or 6 to 40 carbon atoms, or 6 to 30 carbon atoms, or 8 to 30 carbon atoms, or 10 to 30 carbon atoms, or 12 to 30 carbon atoms. Representative but nonlimiting examples of phosphate functional amphoteric surfactants include phosphatidylserines, phosphatidylethanolamines, phosphatidylcholines such as 1-oleoyl-2-palmitoyl-phosphatidylcholine, and sphingomyelins.

In embodiments, the amphoteric surfactant comprises sulfonate moieties. In embodiments, the dialkyl dimethyl ammonium surfactant comprises a hydroxyl moiety. In embodiments, the amphoteric surfactant comprises a hydroxyl moiety. In embodiments, the dialkyl dimethyl ammonium surfactant excludes internal carboxylate anions and carboxylic acid moieties. In embodiments, the amphoteric surfactant excludes internal carboxylate anions and carboxylic acid moieties.

Solvents employed in the compositions (concentrates, injectates, and/or fracturing fluids) comprise, consist essentially of, or consist of coupling agents and water sources. Suitable coupling agents employed in the compositions (concentrates and injectates) comprise, consist essentially of, or consist of water miscible compounds and mixtures of two or more water miscible compounds, wherein the compounds are liquid at temperatures above −40° C. or even lower. The coupling agents do not destabilize the compositions. In some embodiments, the coupling agents increase stability of the compositions. In some embodiments, the coupling agents provide both shelf stability of the concentrates and also impart pourability, pumpability, or flow to the concentrates at temperatures of about −40° C. and up to 100° C. In many embodiments, the coupling agent is fully miscible with water; that is, all possible coupling agent:water ratios may be formed without phase separation. In other embodiments, the coupling agent is miscible with water at least up to about 20:1 to 1:20 water:coupling agent by volume, or about 20:1, about 19:1, about 18:1, about 17:1, about 16:1, about 15:1, about 14:1, about 13:1, about 12:1, about 11:1, about 10:1, about 9:1, about 8:1, about 7:1, about 6:1, about 5:1, about 4:1, about 3:1, about 2:1, about 1:1, about 1:2, about 1:3, about 1:4, about 1:5, about 1:6, about 1:7, about 1:8, about 1:9, about 1:10, about 1:11, about 1:12, about 1:13, about 1:14, about 1:15, about 1:16, about 1:17, about 1:18, about 1:19, or about 1:20 water:coupling agent by volume.

Suitable coupling agents comprise, consist essentially of, or consist of linear, branched, or cyclic aliphatic alcohols having 1 to 6 carbon atoms, diols having 1 to 6 carbon atoms, alkyl ethers of alkylene glycols wherein the alkyl moiety has 1 to 6 carbon atoms (e.g., ethylene glycol mono-n-butyl ether), polyalkylene glycols, and mixtures thereof. Also useful as coupling agents are glycol and glycerol based acetals and ketals, such as those formed from the condensation of e.g. glycerol with formaldehyde, acetone, or oxocarboxylic acids, semialdehydes, and esters thereof such as levulinic acid or an alkyl levulinate. In embodiments, the coupling agent comprises, consists essentially of, or consists of methanol, ethanol, propanol, butanol, glycerol, ethylene glycol, ethylene glycol monoalkyl ether wherein the ether moiety comprises 1 to 6 carbon atoms, or a combination of two or more thereof. In some embodiments, the coupling agent consists essentially of ethylene glycol monobutyl ether.

The total amount of coupling agents included in the concentrate is about 5 wt % to 30 wt % based on the total weight of a concentrate, for example about 5 wt % to 25 wt %, or about 5 wt % to 20 wt %, or about 5 wt % to 15 wt %, or about 6 wt % to 30 wt %, or about 7 wt % to 30 wt %, or about 8 wt % to 30 wt %, or about 9 wt % to 30 wt %, or about 10 wt % to 30 wt based on the total weight of a concentrate. The coupling agent is generally not included in the list of "actives" or active ingredients, but is present in the concentrate to promote and increase storage stability of the concentrate as well as facilitate stability of the composition during dilution of the concentrate to form an injectate. Additionally, in some embodiments the coupling agents further suppress the freezing point of the concentrate which is advantageous for winter storage and transportation purposes. Finally, in some embodiments the coupling agents reduce the viscosity of a concentrate, increasing the pumpability and pourability of the concentrate over a range of field use temperatures.

In embodiments, the weight ratio of the dialkyl dimethyl ammonium surfactant to the amphoteric surfactant in the compositions is about 10:1 to 1:10, or about 9:1 to 1:10, or about 8:1 to 1:10, or about 7:1 to 1:10, or about 6:1 to 1:10, or about 5:1 to 1:10, or about 4:1 to 1:10, or about 3:1 to 1:10, or about 2:1 to 1:10, or about 1:1 to 1:10, or about 10:1 to 1:5, or about 9:1 to 1:5, or about 8:1 to 1:5, or about 7:1 to 1:5, or about 6:1 to 1:5, or about 5:1 to 1:5, or about 4:1 to 1:5, or about 3:1 to 1:5, or about 2:1 to 1:5, or about 1:1 to 1:5, or about 10:1 to 1:3, or about 9:1 to 1:3, or about 8:1 to 1:3, or about 7:1 to 1:3, or about 6:1 to 1:3, or about 5:1 to 1:3, or about 4:1 to 1:3, or about 3:1 to 1:3, or about 2:1 to 1:3, or about 1:1 to 1:3, or about 10:1 to 1:2, or about 9:1 to 1:2, or about 8:1 to 1:2, or about 7:1 to 1:2, or about 6:1 to 1:2, or about 5:1 to 1:2, or about 4:1 to 1:2, or about 3:1 to 1:2, or about 2:1 to 1:2, or about 1:1 to 1:2, or about 10:1 to 1:1, or about 9:1 to 1:1, or about 8:1 to 1:1, or about 7:1 to 1:1, or about 6:1 to 1:1, or about 5:1 to 1:1, or about 4:1 to 1:1, or about 3:1 to 1:1, or about 2:1 to 1:1.

In embodiments, the molar ratio of the dialkyl dimethyl ammonium surfactant to the amphoteric surfactant in the compositions is about 10:1 to 1:3, or about 9:1 to 1:3, or about 8:1 to 1:3, or about 7:1 to 1:3, or about 6:1 to 1:3, or about 5:1 to 1:3, or about 4:1 to 1:3, or about 3:1 to 1:3, or about 2:1 to 1:3, or about 1:1 to 1:3, or about 10:1 to 1:2, or about 9:1 to 1:2, or about 8:1 to 1:2, or about 7:1 to 1:2, or about 6:1 to 1:2, or about 5:1 to 1:2, or about 4:1 to 1:2, or about 3:1 to 1:2, or about 2:1 to 1:2, or about 1:1 to 1:2, or about 10:1 to 1:1, or about 9:1 to 1:1, or about 8:1 to 1:1, or about 7:1 to 1:1, or about 6:1 to 1:1, or about 5:1 to 1:1, or about 4:1 to 1:1, or about 3:1 to 1:1, or about 2:1 to 1:1.

Optionally, one or more demulsifiers are added to a concentrate or injectate to improve the ability of the resulting injectates to prevent emulsions from forming within the subterranean reservoir. The demulsifiers are polymeric. Where present, the demulsifiers are selected from the group comprising, consisting essentially of, or consisting of polyethylenimine alkoxylates, alkoxylated alkylphenol formaldehyde resins, alkoxylated amine-modified alkylphenol formaldehyde resins, ethylene oxide/propylene oxide copolymers, crosslinked ethylene oxide/propylene oxide copolymers, and mixtures of these. Where employed, the demulsifier is present in the concentrates at about 0.01 wt % to 5 wt % based on the total weight of the concentrate, for example about 0.05 wt % to 5 wt %, or about 0.1 wt % to 5 wt %, or about 0.2 wt % to 5 wt %, or about 0.3 wt % to 5 wt %, or about 0.4 wt % to 5 wt %, or about 0.5 wt % to 5 wt %, or about 0.6 wt % to 5 wt %, or about 0.7 wt % to 5 wt %, or about 0.8 wt % to 5 wt %, or about 0.9 wt % to 5 wt %, or about 1.0 wt % to 5 wt %, or about 0.01 wt % to 4.5 wt %, or about 0.01 wt % to 4.0 wt %, or about 0.01 wt % to 3.5 wt %, or about 0.01 wt % to 3.0 wt %, or about 0.01 wt % to 2.5 wt %, or about 0.01 wt % to 2.0 wt %, or about 0.01 wt % to 1.5 wt %, or about 0.01 wt % to 1.0 wt %, or about 0.5 wt % to 4 wt %, or about 0.5 wt % to 3 wt %, or about 0.5 wt % to 2 wt % based on the total weight of a concentrate. In embodiments, the compositions include one or more of the foregoing demulsifiers but exclude or substantially exclude other polymeric species.

The water source employed to form the compositions comprises, consists essentially of, or consists of water. The water source comprises 0 wt % to about 30 wt % total dissolved solids, for example about 100 ppm to 30 wt %, about 1 wt % to 30 wt %, or even about 4 wt % to 30 wt % total dissolved solids. In some embodiments, the water source consists essentially of water; this is most likely to be true with regard to the concentrates. In some embodiments, the water source is produced water; this is most likely to be true with regard to the injectates and fracturing fluids.

In some embodiments, the compositions include one or more additives. Additives include those oil field additives conventionally used in hydraulic fracturing or post-primary fracturing of subterranean hydrocarbon-containing formations. In some embodiments, the additives are added to the concentrates, and the resulting concentrates are stable, or even storage stable. In other embodiments, the additives are not added to the concentrate, but rather are added to the subterranean reservoir contemporaneously with dilution of the concentrate to form a injectate, or are added to the injectate after the injectate is formed. Additives optionally included in the compositions include clay stabilizers, corrosion inhibitors, scale inhibitors, viscosifying agents, flow back aids, friction reducers, proppants, biocides, or mixtures thereof or in various combinations depending on the chemical and physical attributes of the subterranean reservoir addressed and optimization by the operator in such environments.

Suitable clay stabilizers employed in the compositions comprise, consist essentially of, or consist of quaternary ammonium salt polymers having weight average molecular weights of about 500 g/mol to 10,000 g/mol, choline chloride, inorganic salts, and mixtures thereof. Inorganic salts usefully employed as clay stabilizers include KCl, $CaCl_2$, and $MgCl_2$. Additional clay stabilizers useful in the emulsions of the invention are listed at http://booksite.elsevier.com/samplechapters/9780123838445/9780123838445.pdf.

The amount of clay stabilizer employed in a composition is about 1 wt % to 25 wt % based on the total weight of a concentrate, for example about 2 wt % to 25 wt %, or about 3 wt % to 25 wt %, or about 4 wt % to 25 wt %, or about 5 wt % to 25 wt %, or about 6 wt % to 25 wt %, or about 7 wt % to 25 wt %, or about 8 wt % to 25 wt %, or about 9 wt % to 25 wt %, or about 10 wt % to 25 wt %, or about 11 wt % to 25 wt %, or about 12 wt % to 25 wt %, or about 13 wt % to 25 wt %, or about 14 wt % to 25 wt %, or about 15 wt % to 25 wt %, or about 1 wt % to 24 wt %, or about 1 wt % to 23 wt %, or about 1 wt % to 22 wt %, or about 1 wt % to 21 wt %, or about 1 wt % to 20 wt %, or about 1 wt % to 19 wt %, or about 1 wt % to 18 wt %, or about 1 wt % to 17 wt %, or about 1 wt % to 16 wt %, or about 1 wt % to 15 wt %, or about 5 wt % to 20 wt %, or about 10 wt % to 20 wt % based on the total weight of a concentrate.

Suitable corrosion inhibitors include sulfur-functional compounds such as mercaptoethanol, or tertiary amino compounds such as triazine as well as other mercapto and tertiary amino functionalized compounds and polymers. Suitable scale inhibitors include phosphonate compounds and acrylated polymers. In some embodiments, one or more such additives are present in an amount that is less than 1 percent by weight of a concentrate. In other embodiments, each one or more additives are present at about 1 ppm to 500 ppm in a injectate, for example about 2 ppm to 400 ppm, or about 3 ppm to 300 ppm, or about 4 ppm to 200 ppm, or about 5 ppm to 100 ppm of one or more additives.

The compositions of the invention are stable. In some embodiments, the concentrates are storage stable. In some such embodiments, the concentrates are storage stable for about 24 hours and up to two years, or about 6 months to one year at temperatures between about −40° C. and 100° C., or about −30° C. to 100° C., or about −25° C. to 100° C., or about −20° C. to 100° C., or about −15° C. to 100° C., or about −10° C. to 100° C., or about −5° C. to 100° C., or about 0° C. to 100° C., or about 10° C. to 100° C., or about 20° C. to 100° C., or about −30° C. to 90° C., or about −30° C. to 80° C., or about −30° C. to 70° C., or about −30° C. to 60° C., or about −20° C. to 90° C., or about −20° C. to 80° C., or about −20° C. to 70° C., or about −10° C. to 90° C., or about −10° C. to 80° C., or about −10° C. to 70° C., or about 0° C. to 90° C., or about 0° C. to 80° C.

In embodiments, the injectates include about 0.001 wt % (10 ppm) to 1 wt % total surfactant content based on the weight of the injectate. In embodiments, the injectates comprise, consist essentially of, or consist of about 0.001 wt % to 1.00 wt % total surfactant content, for example about 0.005 wt % to 1.00 wt %, or about 0.01 wt % to 1.00 wt %, or about 0.02 wt % to 1.00 wt %, or about 0.03 wt % to 1.00 wt %, or about 0.04 wt % to 1.00 wt %, or about 0.05 wt % to 1.00 wt %, or about 0.06 wt % to 1.00 wt %, or about 0.07 wt % to 1.00 wt %, or about 0.08 wt % to 1.00 wt %, or about 0.09 wt % to 1.00 wt %, or about 0.10 wt % to 1.00 wt %, or about 0.001 wt % to 0.90 wt %, or about 0.001 wt % to 0.80 wt %, or about 0.001 wt % to 0.70 wt %, or about 0.001 wt % to 0.60 wt %, or about 0.001 wt % to 0.50 wt %, or about 0.001 wt % to 0.40 wt %, or about 0.001 wt % to 0.30 wt %, or about 0.001 wt % to 0.20 wt %, or about 0.001 wt % to 0.10 wt %, or about 0.005 wt % to 0.50 wt %, or about 0.005 wt % to 0.40 wt %, or about 0.005 wt % to 0.3 wt %, or about 0.005 wt % to 0.2 wt %, or about 0.005 wt % to 0.1 wt %, or about 0.01 wt % to 0.2 wt %, or about 0.01 wt % to 0.10 wt % total surfactant content.

In embodiments, the injectates include about 0.001 wt % (10 ppm) to 1 wt % actives based on the weight of the injectate, wherein "actives" means the surfactants and any additives present in the composition. In embodiments, the injectates comprise, consist essentially of, or consist of about 0.001 wt % to 1.00 wt % actives, for example about 0.005 wt % to 1.00 wt %, or about 0.01 wt % to 1.00 wt %, or about 0.02 wt % to 1.00 wt %, or about 0.03 wt % to 1.00 wt %, or about 0.04 wt % to 1.00 wt %, or about 0.05 wt % to 1.00 wt %, or about 0.06 wt % to 1.00 wt %, or about 0.07 wt % to 1.00 wt %, or about 0.08 wt % to 1.00 wt %, or about 0.09 wt % to 1.00 wt %, or about 0.10 wt % to 1.00 wt %, or about 0.001 wt % to 0.90 wt %, or about 0.001 wt % to 0.80 wt %, or about 0.001 wt % to 0.70 wt %, or about 0.001 wt % to 0.60 wt %, or about 0.001 wt % to 0.50 wt %, or about 0.001 wt % to 0.40 wt %, or about 0.001 wt % to 0.30 wt %, or about 0.001 wt % to 0.20 wt %, or about 0.001 wt % to 0.10 wt %, or about 0.005 wt % to 0.50 wt %, or about 0.005 wt % to 0.40 wt %, or about 0.005 wt % to 0.3 wt %, or about 0.005 wt % to 0.2 wt %, or about 0.005 wt % to 0.1 wt %, or about 0.01 wt % to 0.2 wt %, or about 0.01 wt % to 0.10 wt % actives.

In embodiments, the concentrates and injectates are characterized as excluding anionic surfactants; excluding nonionic surfactants; or excluding both anionic and nonionic surfactants. In embodiments, the exclusion of one or more of these surfactant species is substantial exclusion.

In embodiments, the concentrates are characterized as pumpable or pourable at temperatures between about −40°

C. and 100° C. In embodiments, the concentrates are stored in a container for at least 24 hours and as long as two years. In embodiments the concentrates are storage stable for at least 24 hours and as long as two years at temperatures between about −40° C. and 100° C., for example about 1 week to two years, or about 1 month to two years, or about 6 months to two years, or about 24 hours to 1 year, or about 24 hours to 6 months, or about 24 hours to 1 month, or about 1 month to 1 year, or about 6 months to 1 year. In embodiments the concentrates are transported, before or after storage, to a location proximal to the wellbore of a subterranean reservoir. In embodiments, the concentrates are pumped or poured from a container situated proximal to the wellbore of a subterranean reservoir and subsequently or contemporaneously diluted with a water source and injected into the subterranean reservoir.

The presently disclosed concentrates are shelf stable and may be stored or transported, yet are pumpable or pourable for combining with a water source to form an injectate. The combining of a concentrate with a water source is referred to as dilution. Dilution may be suitably carried out using any known technique available to the skilled artisan for diluting concentrated surfactant compositions prior to or contemporaneously with injection into a subterranean reservoir. For example, static or dynamic mixers are usefully employed along with a source of water to combine a concentrate with e.g. connate, surface water, sea water, purified water, or a produced water flowing back from a subterranean reservoir.

It is a feature of the concentrates that dilution to form an injectate is easily accomplished: most concentrated surfactant compositions, that is, compositions including 5 wt % solids and above, form gels or thick, viscous and even paste-like consistencies that are difficult to handle and particularly difficult to dilute rapidly. The concentrates described herein are stable and flowable (and/or pumpable or pourable) at temperatures between −40° C. and 100° C. and thus are advantageously mixed with a water source immediately prior to, or contemporaneously with, injection of the resulting injectate into a subterranean reservoir. A homogenous injectate is easily formed with simple dilution and mixing of a concentrate; no extraordinary equipment or technique (e.g. high shear, high efficiency mixing, etc.) is needed to dilute the concentrates or to inject the injectates.

The injectates comprise about 99 wt % to 99.999 wt % of a water source and about 0.001 wt % to 1 wt % total surfactant, as selected by the user. In some embodiments the water source is a high temperature water source, a high total dissolved solids water source, or a high temperature, high total dissolved solids water source. In embodiments, conditions within the subterranean reservoir include high temperature, high total dissolved solids water sources, high pressure, or a combination of two or more thereof in at least one subterranean area contacted by the injectate.

Any combination of the above components is suitably combined to form a composition for use in obtaining hydrocarbon product from a hydrocarbon-bearing subterranean reservoir. Concentrates according to the above description and combined in any manner and including any of the above components in any combination are suitably formed and then stored and/or diluted as described above and using any of the conditions described above in any combination. Injectates according to the above description and combined in any manner and including any of the above components in any combination are suitably formed using any of the conditions described above in any combination. Injectates are suitably formed by dilution of concentrates, or by direct combination of injectate components. Concentrates are used to form injectates, optionally after a storage period. Injectates are used to inject into a hydrocarbon-bearing subterranean reservoir. The injectates are used to obtain hydrocarbon products from hydrocarbon-bearing subterranean reservoirs.

The dilution of the concentrate to form the injectate is accomplished using a water source; in some embodiments the water source comprises, consists essentially of, or consists of produced water. In some embodiments, one or more proppants are added to the concentrate or to the injectate for purposes of hydraulic fracturing, wherein the combination of injectate and proppant is referred to as a fracturing fluid. Suitable proppants comprise, consist of, or consist essentially of sand or aluminum oxide. Other additives suitably added to the concentrates, injectates, or fracturing fluids include pH adjustment agents such as mineral acids or bases, or other additives incorporated by the operator for use in the specific subterranean reservoir from which a hydrocarbon is being recovered, and/or in conjunction with the specific step being carried out in the recovery of the hydrocarbon. In other embodiments, one or more such additives are included in the concentrate instead, and thus are not added by the operator in the field.

After subterranean injection, rock contacted by an injectate according to any of the above embodiments changes from oil-wettable to water-wettable. For example, the contact angle of an oil drop on an oil-saturated rock surface is 0° or substantially 0°; by contacting the oily rock surface with an injectate, the contact angle of an oil drop on the contacted rock surface is changed to about 60° to 1000, or about 60° to 950, or about 60° to 90°, or about 70° to 1000, or about 80° to 1000, or about 70° to 900, or about 80° to 900. Yet the components of the injectates exhibit a low tendency to adsorb onto the rock, which means that the surfactants are not rapidly depleted from the injectate as it flows within the subterranean reservoir. The injectates do not contribute to formation of crude oil emulsions and actually inhibit formation of emulsions in underground fluid flows, whereas oil/water and water/oil emulsions are commonly formed when injectates comprising surfactants are combined with produced water and crude oil beneath the surface of the earth.

Injecting the injectates into a subterranean reservoir substantially increases the yield, rate of flow, or both of hydrocarbons obtained from a well in fluid connection to a hydrocarbon-bearing subterranean reservoir. Injecting the injectates into a well increases yield, rate of flow, or both of hydrocarbons obtained from reservoirs comprising high temperature water sources, high total dissolved solids water sources, or high temperature/high total dissolved solids water sources. Injecting the injectates into a well increases yield, rate of flow, or both of hydrocarbons obtained in enhanced hydrocarbon recovery processes, including secondary oil recovery and tertiary oil recovery. Injecting the injectates into a well increases yield, rate of flow, or both of hydrocarbons obtained from reservoirs characterized as having tight rock, or even very tight rock. Injecting the injectates into a well increases yield, rate of flow, or both of hydrocarbons obtained from reservoirs wherein the hydrocarbon is characterized as "heavy oil" or as having a high paraffin content.

In any of the above injecting, the injectate may further include a proppant such as sand or aluminum oxide, wherein this mixture is characterized as a fracturing fluid. Injection of a fracturing fluid is carried out contemporaneously with an hydraulic fracturing process, employing the fracturing fluid as the hydraulic fluid. In such processes, the fracturing fluids described herein are effective to increase the rate of collection, total yield of hydrocarbon collection, or both from tight shale reservoirs, including those typically subjected to hydraulic fracturing methodologies. We have found that the disclosed compositions provide highly desirable performance attributes for recovery of hydrocarbon compounds from hydrocarbon-containing subterranean fractured rock formations. Injectate/fracturing fluid performance is added to the beneficial performance of the concentrates which are pumpable or pourable and easily combined with a water source to form the injectates.

The injectates and fracturing fluids described herein alter the wettability of the reservoir rock from oil-wet to water-wet, while exhibiting low adsorption to the rock itself so as to minimize the rate of surfactant depletion as the composition proceeds to flow within the subterranean reservoir. The presently disclosed compositions also impart low interfacial tension to water sources comprising high salinity and/or total dissolved solids of up to about 30 wt %, yet prevent formation of emulsions with the hydrocarbon products that are the target of the recovery operation. Finally, the presently disclosed compositions are stable within the subterranean reservoir while exhibiting all of the foregoing properties. The aqueous environment within tight shale reservoirs can include high temperature, high total dissolved solids, high pressure, or a combination of two or more thereof.

Methods

The following descriptions of the methodology include descriptions of individual actions, wherein any of the individual actions are intended to be combined with any other individual actions without limitation except where specified otherwise. Further, the methods as described below are intended to be combined with the use of any of the foregoing compositions, without limitation except where specifically limited or limited by context.

In embodiments, the components of the composition are combined in any order and using any method known to those of skill in forming admixtures. Concentrates are suitably formed by combining the components of the compositions described above in any order to result in a concentrate having about 5 wt % to 90 wt % surfactant content, further wherein the concentrates are pourable or pumpable to enable easy dilution in the field. In some embodiments, one or more additional components are added to the concentrate, or to the injectate for purposes of hydraulic fracturing. Such additional components (additives) include any of those recited above. The dilution of the concentrate to form the injectate or fracturing fluid is accomplished using a water source; in some embodiments the water source comprises, consists essentially of, or consists of produced water.

In some embodiments, the concentrate is combined with a water source and any desired additives to produce an injectate contemporaneously with one or more subterranean injection processes; in other embodiments the combining is prior to injecting. The injectate is injected via a well into a subterranean hydrocarbon containing reservoir, where it results in increased rate, overall yield, or both of hydrocarbon compounds collected or recovered from the reservoir. In some embodiments, the water source, the subterranean environment, or both are high temperature, include high total dissolved solids, or both. In embodiments the subterranean reservoir includes tight rock, very tight rock, heavy oil, high paraffin content, or a combination of two or more thereof.

Injection of the injectates results in increased rate of recovery, total yield of hydrocarbon compounds, or both obtained from a subterranean reservoir. In some embodiments, the reservoir is a tight shale reservoir, a sandstone reservoir, or a carbonate reservoir. In embodiments, the reservoir is characterized by one or more of the following: tight rock, very tight rock, low permeability, low porosity, high temperature, high total dissolved solids in a subterranean water source, and high divalent cation content of a subterranean water source. Where the injecting is contemporaneous with hydraulic fracturing, the injectate includes a proppant as an additive and is referred to as a fracturing fluid.

Further, the injectates are stable both before and after subterranean injection. That is, the injectates do not phase separate in the presence of produced water, rock surfaces, high temperature, or the combination thereof. In embodiments, the injectates are formed by combining a concentrate (optionally after a storage period) with a produced water. In embodiments the produced water includes high total dissolved solids. The injectates thus formed are stable mixtures and do not phase separate. Further, the injectates are stable for an extended period of time within subterranean reservoirs, including under conditions of high temperature, high total dissolved solids, or a combination thereof. For example, the injectates do not phase separate at temperatures of about 100° C. to 200° C., or about 100° C. to 190° C., or about 100° C. to 180° C., or about 100° C. to 170° C., or about 100° C. to 160° C., or about 100° C. to 150° C., for periods of at least 7 days to 90 days, or for a period of 7 days to 90 days, or 7 days to 80 days, or 7 days to 70 days, or 7 days to 60 days, or 7 days to 50 days, or 7 days to 40 days, or 7 days to 30 days. Further, in embodiments the injectates are stable for the foregoing periods of time and/or at the foregoing temperatures under high pressure (pressure in excess of atmospheric pressure on the surface of the earth) such as pressure encountered naturally in subterranean environments, pressure applied during hydraulic fracturing or another human-facilitated subterranean process, or a combination thereof.

We have unexpectedly found that the combination of the dialkyl dimethylammonium surfactant and the amphoteric surfactant, exclusive of anionic surfactants, and in some embodiments exclusive of nonionic surfactants, provide stable concentrates and injectates. Notably, when tested individually, the dialkyl dimethylammonium surfactants and the amphoteric surfactants are not stable at high temperature, high total dissolved solids, or a combination thereof. The dialkyl dimethylammonium surfactants and the amphoteric surfactants individually were observed to phase separate when subjected to temperatures of 160° C. for 30 days or less, even where the water source used to form the injectate includes less than 1 wt % total dissolved solids. However, the combination of one or more dialkyl dimethylammonium surfactant and one or more amphoteric surfactant, exclusive of anionic and nonionic surfactants, is stable under such conditions. This result is unexpected, as there is no reason provided in the known art tending to lead one of skill to believe that a combination of dialkyl dimethylammonium surfactant with amphoteric surfactant, exclusive of anionic and nonionic surfactants, would be more stable as an injectate than an injectate including either one of these surfactants alone.

Accordingly, a method comprises, consists essentially of, or consists of forming a concentrate, storing the concentrate for a period of about 1 day to two years, diluting the concentrate with a water source to form an injectate, and injecting the injectate into a subterranean reservoir. In embodiments the water source is a produced water. In embodiments the subterranean reservoir includes one or more of: high temperature, high pressure, high total dissolved solids water sources, tight rock, very tight rock, heavy oil, and hydrocarbon having high paraffin content.

In embodiments, the injectate is disposed within the subterranean reservoir for at least 7 to 90 days, where it does not phase separate. Another method includes injecting an injectate into a first well which is in fluid connection with a subterranean hydrocarbon-containing formation, followed by collecting one or more hydrocarbon compounds from the first well. Yet another method includes injecting an injectate into a first well which is in fluid connection with a subterranean hydrocarbon-containing formation, followed by collecting one or more hydrocarbon compounds from a second well, wherein the second well is also fluidly connected to the subterranean hydrocarbon-containing formation. In embodiments, one or more such wells are wellbores—that is, man-made fluid connections to a subterranean reservoir that is further adapted to collect the hydrocarbon.

In some embodiments, after about 1 second of contact with rock previously soaked in hydrocarbon compounds, contact angle of a drop of an injectate applied to the surface of the rock is observed to be 70° or less, such as about 5° to 70°, or about 10° to 70°, or about 20° to 70°, or about 30° to 70°, or about 40° to 70°, or about 50 to 65°, or about 50 to 60°, or about 50 to 55°, or about 50 to 50°, or about 50 to 45°, or about 10° to 60°, or about 10° to 50°, or about 20° to 50°, or about 30° to 50°. In some embodiments, after about 10 seconds of contact with rock previously soaked in hydrocarbon compounds, contact angle of a drop of an injectate applied to the surface of the rock is observed to be 50° or less, such as about 50 to 50°, or about 10° to 50°, or about 20° to 50°, or about 30° to 50°, or about 50 to 45°, or about 50 to 40°, or about 50 to 350, or about 10° to 350, or about 10° to 300, or about 20° to 40°, or about 25° to 40°. In some embodiments, after about 60 second of contact with rock previously soaked in hydrocarbon compounds, contact angle of a drop of an injectate applied to the surface of the rock is observed to be 40° or less, such as about 5° to 40°, or about 7° to 40°, or about 10° to 40°, or about 15° to 40°, or about 20° to 40°, or about 50 to 350, or about 50 to 300, or about 50 to 25°, or about 50 to 20°, or about 70 to 300, or about 70 to 25°, or about 10° to 25°.

In some embodiments, the injecting of the injectate is carried out after hydraulic fracturing of the reservoir. In some cases, the injectate is injected into a reservoir wherein no hydraulic fracturing has been carried out. In other embodiments, injecting of the injectate is carried out contemporaneously with hydraulic fracturing of the reservoir. The methods of the invention are particularly useful in secondary and tertiary oil recovery, collectively referred to herein as enhanced oil recovery, which is any injection carried out after the fluid connection of a well is already established.

The compositions of the invention are also suitably employed for enhanced oil recovery in one or more steam assisted gravity drainage (SAGD) processes. SAGD is an enhanced oil recovery technology for producing heavy crude oil and bitumen. It is an advanced form of steam stimulation in which a pair of parallel horizontal wells is drilled into a subterranean reservoir, one a few meters above the other. High pressure steam is continuously injected into the upper wellbore to heat the oil and reduce its viscosity, causing the heated oil to drain into the lower wellbore, where it is pumped out. In such processes, the injectates of the invention are usefully injected along with the steam to affect subterranean wettability, surface tension, and the like.

Having described the invention in detail, it will be apparent that modifications and variations are possible without departing from the scope of the invention defined in the appended claims. The following non-limiting examples are provided to further illustrate the present invention.

EXPERIMENTAL

Example 1

Compositions 1-15 below, including comparative Compositions 7C, 9C, 10C, 12C, and 13C were admixed. Then the compositions were individually mixed with Eagle Ford produced brine (produced water having 0.7 wt % total dissolved solids) to form aqueous mixtures having 0.1 wt % (1000 ppm) total surfactant concentration. The brine mixtures were sealed and equilibrated to 160° C. and were maintained under these conditions for up to 1 month, during which the mixtures were observed at least once per day. During this observation period, evidence of phase separation, such as precipitation or suspension formation, was noted. A mixture remaining visibly clear for the duration of the observation period is considered to have sufficient aqueous stability for use as a subterranean injectate.

Compositions 1-8, 11, and 14-15 were determined to be stable, whereas 9C, 10C, and 12C were observed to phase separate after about 1 month. Compositions 7C and 13C were not tested.

Composition 1: 57.1 wt % dicoco dimethyl ammonium chloride, 28.6 wt % lauryl hydroxylsultaine, 14.3 wt % isopropanol Composition 2: 57.1 wt % dicoco dimethyl ammonium chloride, 28.6 wt % lauryl betaine, 14.3 wt % isopropanol Composition 3: 42.9 wt % dicoco dimethyl ammonium chloride, 42.9 wt % lauryl hydroxylsultaine, 14.2 wt % isopropanol Composition 4: 44 wt % dicoco dimethyl ammonium chloride, 44 wt % lauryl betaine, 12 wt % isopropanol Composition 5: 50 wt % dicoco dimethyl ammonium chloride, 37.5 wt % lauryl betaine, 12.5 wt % isopropanol Composition 6: 66.7 wt % dicoco dimethyl ammonium chloride, 16.7 wt % lauryl hydroxylsultaine, 16.6 wt % isopropanol Composition 7C: 100 wt % lauryl hydroxylsultaine Composition 8: 60 wt % dicoco dimethyl ammonium chloride, 20 wt % lauryl hydroxylsultaine, 20 wt % methanol Composition 9C: 39 wt % didecyl diphenyl ether disulfonate, 39 wt % C14-C14 alpha olefin sulfonate, 20 wt % methanol, 1 wt % crosslinked EO/PO polymer, 1 wt % polyethylene imine ethoxylate Composition 10C: 100 wt % dicoco dimethyl ammonium chloride Composition 11: 60 wt % dicoco dimethyl ammonium chloride, 20 wt % lauryl hydroxylsultaine, 1.5 wt % crosslinked EO/PO polymer (demulsifier), 18.5 wt % methanol Composition 12C: 55 wt % internal olefin sulfonate, 19 wt % lauryl hydroxysultaine, 17.3 wt % ethylene glycol, 8.7 wt % methanol Composition 13C: 100 wt % lauryl trimethyl ammonium chloride Composition 14: 42.9 wt % dicocodimethyl ammonium chloride, 14.3 wt % lauryl hydroxylsultaine, 21.4 wt % IPA, 21.4 wt % water Composition 15: 52.5 wt % dicocodimethyl ammonium chloride, 17.5 wt % lauryl hydroxylsultaine, 15 wt % IPA, 15 wt % water

Example 2

Eagle Ford reservoir rock core plugs were immersed in Eagle Ford oil (a crude oil mixture) for at least 4 days to achieve oil wet status. The core plugs were then wiped with a cloth to remove excess oil and placed into glass imbibition cells with precision graduations of 0.1 mL. The cores were placed having all faces opened. The performance of Composition 8 was compared to that of 9C, 12C, and 13C at the concentration indicated in Table 1 by diluting the product with tap water. A "blank" test with no surfactants or other additives was also conducted. Each cell was filled with a volume of surfactant composition (or in the case of the Blank, tap water was added), and then the cell was immersed into a temperature bath set to a temperature of 130° C. for 500 hours or until no more oil was observed to be displaced. No pressure was applied to the cells during the test. The volume of oil displaced was used to calculate the oil rate and % Original Oil In Place (OOIP) oil recovery. Table 1 shows results of these tests.

TABLE 1

% OOIP measured using Eagle Ford cores and Eagle Ford oil for various surfactants in 0.7% TDS brine at 130° C.

| Composition | Total concentration of surfactant, ppm | % OOIP |
|---|---|---|
| None (Blank) | 0 | 22.3 |
| 9C | 1000 | 24.5 |
| 12C | 1000 | 26.0 |
| 13C | 1000 | 23.1 |
| 8 | 600 | 30.7 |
| 8 | 1000 | 56.5 |

Example 3

A spinning drop tensiometer was employed to measure the interfacial tension (dyne/cm) of the Eagle Ford crude oil on the surface of the rock core chip while the chip was immersed in Eagle Ford synthetic brine at 80° C. or 2 wt % KCl at 80° C. Eagle Ford brine (0.7 wt % TDS) or 2 wt % KCl was used as the diluent for the indicated Compositions to form test solutions having 1000 ppm total surfactant for test. Results are shown in Table 2.

TABLE 2

Interfacial tension at 1000 ppm total surfactant in the indicated diluent brine against the Eagle Ford oil at 80° C., for the indicated Compositions.

| Composition | IFT, dyne/cm | Diluent |
|---|---|---|
| 8 | 0.010 | Eagle Ford brine (0.7 wt % TDS) |
| 8 | 0.015 | 2% KCl |
| 10C | >3 | Eagle Ford brine (0.7 wt % TDS) |
| 10C | >3 | 2% KCl |
| 7C | 1.9 | Eagle Ford brine (0.7 wt % TDS) |
| 1 | 0.015 | Eagle Ford brine (0.7 wt % TDS) |
| 2 | 0.12 | Eagle Ford brine (0.7 wt % TDS) |
| 3 | 0.086 | Eagle Ford brine (0.7 wt % TDS) |
| 4 | 0.138 | Eagle Ford brine (0.7 wt % TDS) |
| 5 | 0.14 | Eagle Ford brine (0.7 wt % TDS) |
| 6 | 0.036 | Eagle Ford brine (0.7 wt % TDS) |
| 6 | 0.032 | 2% KCl |

TABLE 2-continued

Interfacial tension at 1000 ppm total surfactant in the indicated diluent brine against the Eagle Ford oil at 80° C., for the indicated Compositions.

| Composition | IFT, dyne/cm | Diluent |
|---|---|---|
| 9C | >1 | Eagle Ford brine (0.7 wt % TDS) |
| 11 | 0.008 | Eagle Ford brine (0.7 wt % TDS) |
| 14 | 0.005 | Eagle Ford brine (0.7 wt % TDS) |
| 15 | 0.007 | Eagle Ford brine (0.7 wt % TDS) |

Example 4

Compositions 8, 11, and 12C were diluted to 1000 ppm total surfactant in Eagle Ford brine (0.7% TDS) to provide a total of 5 mL mixture for each of the Compositions. A blank was also prepared, which was 5 mL of Eagle Ford brine without any surfactants or other additives. These mixtures were placed in small test tubes. To each tube, 5 mL of Eagle Ford crude oil was added. The test tubes were equilibrated to a temperature of about 80° C. Then each brine-oil mixture was stoppered and hand-shaken for 2 minutes. The appearance of the shaken mixture was observed, wherein the observation of emulsion formation was noted.

Compositions 8 and 11 did not exhibit any observable evidence of emulsion formation. The blank also showed no evidence of emulsion formation. Composition 12C was observed to form an opacified area at the oil/water interface that was coherent, rigid and viscous. This observation is consistent with emulsion formation in mixtures of crude oil and produced water.

Example 5

Crude hydrocarbon samples (which include both hydrocarbon and produced water) were obtained from reservoirs in different geological areas within Eagle Ford, Area 1 and Area 2, and the samples were analyzed. The hydrocarbon obtained from Area 1 included 1.6 wt % aromatic compounds (including but not limited to toluene, xylene, and the like) and 37 wt % paraffin (defined as $C_nH_{n+2}$ where n is 1 or greater). A sample of hydrocarbon from Area 2 included less than 1 wt % of aromatics and less than 1 wt % paraffin. The produced water obtained from Area 1 included 7000 mg/L total dissolved solids, with pH of 7.1; dissolved species included 440 mg/L Ca, 23 mg/L Mg, 2000 mg/L Na, 3690 mg/L Cl, 27 mg/L K, and 480 mg/L $HCO_3$. The produced water obtained from Area 2 included 490 mg/L total dissolved solids, with pH of 8; dissolved species included 51 mg/L Ca, 0.9 mg/L Mg, 240 mg/L Na, 410 mg/L Cl, and 4.2 mg/L Fe.

Compositions 16, 17, and 18 (listed below) were admixed. Then the compositions were individually mixed with Eagle Ford produced brine (produced water having 0.7 wt % total dissolved solids) to form aqueous mixtures having 0.1 wt % (1000 ppm) total surfactant concentration.

Composition 16: 32 wt % dicocodimethyl ammonium chloride, 7.15 wt % lauryl hydroxysultaine, 21.4 wt % IPA, 21.4 wt % water Composition 17: 27.9 wt % dicocodimethyl ammonium chloride, 10 wt % lauryl hydroxysultaine, 21.4% IPA, 21.4% water Composition 18: 12.9 wt % dicocodimethyl ammonium chloride, 20 wt % lauryl hydroxysultaine, 21.4% IPA, 21.4% water Compositions 16-18 were subjected to interfacial tension measurement using the general procedure of Example 3, wherein the interface is between the oil and produced water of Eagle Ford, Area 2. Table 3 shows interfacial tension, in dynes/cm, as a function of the ratio of lauryl hydroxysultaine (LHS) to dicocodimethylammonium chloride (DCDMAC).

TABLE 3

Interfacial tension, dyne/cm measured for Compositions 16-18 added at 1000 ppm to Eagle Ford Area 2 oil/brine mixture.

| Composition | Weight ratio, LHS:DCDMAC | IFT, dyne/cm |
|---|---|---|
| 16 | 0.22 | 0.13 |
| 17 | 0.36 | 0.07 |
| 18 | 1.55 | 0.012 |

Example 6

Compositions 17 and 18 were used in an oil imbibition test, using the procedure of Example 2. Cores used in the test were large and intact with very little fracturing observable. At the outset of the imbibition, 1000 ppm actives (that is, the total ppm of lauryl hydroxysultaine (LHS) plus total ppm of dicocodimethyl ammonium chloride (DCDMAC)) were applied. After 500 hours, the core samples treated with 1000 ppm actives of Composition 16 produced about 20% OOIP, while the core samples treated with 1000 ppm actives of Composition 18 produced about 40% OOIP—that is, about 100% more oil recovered by Composition 18 compared to Composition 17.

After the 500 hour measurement was taken, a second aliquot of 1000 ppm actives of Composition 18 was added to the same imbibition cell previously treated. After another 500 hours passed (that is, total test time of 1000 hours) an additional 30% OOIP was recovered from the core over the initial 40% OOIP recovered in the first 500 hours. Stated differently, Composition 18 resulted in a total of 70% OOIP recovered after 1000 hours and applying the composition in two doses. The second dosing correlates to secondary oil recovery or tertiary oil recovery injections.

Example 7

The pour point of a concentrate of the invention was measured using a modified procedure under ASTM D97, wherein the temperature is lowered by immersing the sample to be tested into a cooling bath. At each interval of 3° C., the test jar is removed and tilted to check for movement of the contents. When the contents are not observed to flow when tilted, the jar is tilted to a substantially horizontal position (90° from the position held in the cooling bath) and held there for about 5 seconds. If the contents of the jar are not observed to flow in the horizontal orientation, 3° C. is added to the most recently measure temperature to provide the measured pour point temperature.

Using this procedure, a concentrate having 42.9 wt % dicocodimethyl ammonium chloride, 14.3 wt % lauryl hydroxysultaine, 21.4 wt % isopropanol, and 21.4% water was found to have a pour point of −27° C.

What is claimed is:

1. A composition consisting essentially of:
   (a) a dialkyl dimethyl ammonium surfactant or a mixture of two or more thereof;
   (b) an amphoteric surfactant or a mixture of two or more thereof; and
   (c) a solvent selected from a water source, a coupling agent, or a mixture of two or more thereof.

2. The composition of claim 1 wherein the composition is a concentrate, the concentrate comprising about 5 wt % to 90 wt % total surfactant based on the weight of the concentrate, wherein the concentrate and is storage stable and pumpable or pourable for about 24 hours to two years at temperatures between −40° C. and 100° C.

3. The composition of claim 2 wherein the concentrate comprises about 5 wt % to 30 wt % of a coupling agent based on the weight of the concentrate.

4. The composition of claim 1 wherein the composition is an injectate, the injectate comprising about 10 ppm to 10,000 ppm total surfactant based on the weight of the concentrate.

5. The composition of claim 1 wherein the water source is a high total dissolved solids water source, a high temperature water source, or a high total dissolved solids, high temperature water source.

6. The composition of claim 1 wherein the dialkyl dimethyl ammonium surfactant has the formula $R^1R^2N^+(CH_3)_2 X^-$, wherein $R^1$ and $R^2$ are independently selected from linear, branched, alicyclic, aryl, and alkaryl groups having 8 to 30 carbon atoms and X is a halide.

7. The composition of claim 1 wherein the dialkyl dimethyl ammonium surfactant is dicoco dimethylammonium chloride.

8. The composition of claim 1 wherein the amphoteric surfactant comprises a single internal cation, a single internal anion, and a hydrophobic moiety selected from linear, branched, alicyclic, aryl, and alkaryl groups having 6 to 50 carbon atoms.

9. The composition of claim 1 wherein the amphoteric surfactant is lauryl hydroxylsultaine.

10. The composition of claim 1 wherein the ratio of the dialkyl dimethyl ammonium surfactant to the amphoteric surfactant in the composition is about 10:1 to 1:3 by weight.

11. A method of increasing recovery of a hydrocarbon from a subterranean reservoir, the method comprising:
    combining a concentrate consisting essentially of a dialkyl dimethyl ammonium surfactant or a mixture of two or more thereof, an amphoteric surfactant or a mixture of two or more thereof, and a coupling agent or a mixture of two or more thereof with a water source to form an injectate, the injectate comprising 10 ppm to 10,000 ppm total surfactant based on the weight of the injectate;
    injecting the injectate into the subterranean reservoir; and
    collecting a hydrocarbon from the subterranean reservoir.

12. The method of claim 11 wherein the subterranean reservoir comprises one or more of: tight rock, very tight rock, heavy hydrocarbon (heavy oil), high paraffin content hydrocarbon, high temperature, high pressure, high total dissolved solids water source.

13. The method of claim 11 wherein the combining further comprises combining a proppant with the injectate, further wherein the injecting is contemporaneous with an hydraulic fracturing.

14. The method of claim 11 wherein the injecting is into a first wellbore fluidly connected to the subterranean reservoir, and the collecting is from a second wellbore fluidly connected to the subterranean reservoir.

15. The method of claim 11 wherein the injecting and the collecting are carried out at the same wellbore.

16. The method of claim 11 wherein a wellbore is established prior to the injecting.

17. The method of claim 11 wherein the combining is diluting a concentrate with a water source, further wherein the method includes

- forming a concentrate, the concentrate comprising about 5 wt % to 90 wt % total surfactant based on the weight of the concentrate and about 5 wt % to 30 wt % of the coupling agent based on the weight of the concentrate; and
- optionally storing the concentrate in a container for a period of about 24 hours to two years before the diluting.

18. The method of claim 17 wherein the combining is carried out contemporaneously with the injecting.

19. A composition consisting essentially of:
(a) a dialkyl dimethyl ammonium surfactant or a mixture of two or more thereof;
(b) an amphoteric surfactant or a mixture of two or more thereof;
(c) a solvent selected from a water source, a coupling agent, or a mixture of two or more thereof; and
(d) a demulsifier, a proppant, or a combination thereof, wherein the demulsifier is selected from the group consisting of polyethylenimine alkoxylates, alkoxylated alkylphenol formaldehyde resins, alkoxylated amine-modified alkylphenol formaldehyde resins, ethylene oxide/propylene oxide copolymers, crosslinked ethylene oxide/propylene oxide copolymers, and mixtures of two or more thereof.

\* \* \* \* \*